US012656228B2

(12) United States Patent 
Mizutani et al.

(10) Patent No.: US 12,656,228 B2 
(45) Date of Patent: Jun. 16, 2026

(54) GAS MEASUREMENT DEVICE, GAS MEASUREMENT SYSTEM, AND GAS MEASUREMENT METHOD

(71) Applicants: SINTOKOGIO, LTD., Nagoya (JP); National University Corporation TOYOHASHI UNIVERSITY OF TECHNOLOGY, Toyohashi (JP)

(72) Inventors: Manase Mizutani, Nagoya (JP); Yoshihisa Suzuki, Nagoya (JP); Kazuaki Sawada, Toyohashi (JP); Toshihiko Noda, Toyohashi (JP)

(73) Assignees: SINTOKOGIO, LTD., Nagoya (JP); National University Corporation TOYOHASHI UNIVERSITY OF TECHNOLOGY, Toyohashi (JP)

( * ) Notice: Subject to any disclaimer, the term of this patent is extended or adjusted under 35 U.S.C. 154(b) by 272 days.

(21) Appl. No.: 18/386,306

(22) Filed: Nov. 2, 2023

(65) Prior Publication Data

US 2024/0151693 A1 May 9, 2024

(30) Foreign Application Priority Data

Nov. 7, 2022 (JP) ................................. 2022-178251

(51) Int. Cl.
| | |
|---|---|
| *G01N 1/22* | (2006.01) |
| *B01D 46/10* | (2006.01) |
| *G01N 29/24* | (2006.01) |
| *G01N 29/34* | (2006.01) |

(52) U.S. Cl.
CPC .......... *G01N 1/2205* (2013.01); *B01D 46/10* (2013.01); *G01N 29/2437* (2013.01); *G01N 29/348* (2013.01)

(58) Field of Classification Search
CPC ............... G01N 1/2202; G01N 1/2205; B01D 46/0052; B01D 46/0053; G01M 3/20
See application file for complete search history.

(56) References Cited

U.S. PATENT DOCUMENTS

2025/0027921 A1* 1/2025 Yamaguchi .............. G01N 1/22

FOREIGN PATENT DOCUMENTS

| | | |
|---|---|---|
| CN | 113777246 A | 12/2021 |
| CN | 114487278 A | 5/2022 |
| EP | 3 370 057 B1 | 2/2021 |
| JP | 2000-249644 A | 9/2000 |
| JP | 2016-186426 A | 10/2016 |

OTHER PUBLICATIONS

Extended European Search Report issued Mar. 1, 2024 in Application No. 23207918.6.

* cited by examiner

*Primary Examiner* — Erika J. Villaluna 
(74) *Attorney, Agent, or Firm* — Faegre Drinker Biddle & Reath LLP

(57) ABSTRACT
The gas measurement device includes a filter unit including a plurality of terminals configured to be applied a voltage or a current and a filter configured to vibrate in response to the voltage or the current being applied to the plurality of terminals and a gas sensor configured to detect gas molecules passing through the filter and output a measurement value corresponding to the detected gas molecules.

8 Claims, 5 Drawing Sheets

GAS MEASUREMENT DEVICE, GAS MEASUREMENT SYSTEM, AND GAS MEASUREMENT METHOD

CROSS-REFERENCE TO RELATED APPLICATION

This application is based on Japanese Patent Application No. 2022-178251 filed with Japan Patent Office on Nov. 7, 2022, the entire contents of which are hereby incorporated by reference.

TECHNICAL FIELD

The present disclosure relates to a gas measurement device, a gas measurement system, and a gas measurement method.

BACKGROUND

Japanese Patent Application Publication No. 2000-249644 discloses a gas measurement device. The gas measurement device includes a Langmuir-Blodgett membrane (hereinafter, referred to as an LB membrane) and a gas sensor for detecting molecules passing through the LB membrane. Since the LB membrane adsorbs certain gas molecules, the gas sensor selectively detects only the sifted molecules.

SUMMARY

In the gas sensor described in Japanese Patent Application Publication No. 2000-249644, when the LB membrane becomes saturated with adsorbed gas molecules, the adsorption force significantly decreases. When the adsorption force decreases, the sieving function of gas molecules is not adequately performed. When the sieving function of gas molecules is not adequately performed, it becomes necessary to desorb the gas molecules adsorbed on the LB membrane or to replace the LB membrane. However, depending on the nature of the gas molecules, it may be difficult to desorb the gas molecules. Replacing the LB membrane requires a new LB membrane, and the replacement process is also time-consuming. The present disclosure provides a technique for suppressing deterioration of the gas molecule sieving function.

A gas measurement device according to an aspect of the present disclosure includes a filter unit and a gas sensor. The filter unit includes a plurality of terminals configured to be applied a voltage or a current and a filter configured to vibrate in response to the voltage or the current being applied to the plurality of terminals. The gas sensor detects gas molecules that have passed through the filter and outputs a measurement value corresponding to the detected gas molecules.

In the gas measurement device, the filter of the filter unit vibrates in response to application of voltage or current to a plurality of terminals of the filter unit. The filter allows gas molecules having a size corresponding to mesh of the filter to pass through. The gas molecules passing through the filter are detected by a gas sensor, and a measurement value is output. Gas molecules larger than the mesh of the filter cannot pass through the filter and tend to stay so as to block the mesh of the filter. The filter repels gas molecules that are about to stay by vibration, and prevents the mesh of the filter from being blocked. Therefore, the gas measurement device can suppress deterioration of the gas molecule sieving function. Further, even if clogging of the filter occurs due to gas molecules larger than the mesh of the filter, the large gas molecules clogged in the mesh of the filter can be removed only by sucking while vibrating the filter. Therefore, the gas measurement device can easily recover the sieving function.

In an embodiment, the gas measurement device may include a plurality of filter units including a filter unit, wherein the plurality of filter units may be disposed to overlap each other. The gas measurement device can realize high-accuracy screening by adopting a multistage filter.

In an embodiment, a pulse voltage may be applied to the plurality of terminals, the filter unit may include a piezoelectric element electrically connected to the plurality of terminals, and the filter may be supported by the piezoelectric element. The filter may realize vibration through which gas molecules having a size of a detection target may pass by a piezoelectric element that expands and contracts according to a pulse voltage.

In one embodiment, the current may be applied to the plurality of terminals, the filter unit may include a metal member electrically connected to the plurality of terminals, and the filter may be supported by the metal member. When the current is applied to the metal member, the free electrons collide with the atom, causing lattice vibrations, which are transmitted to the filter. The filter can realize vibration through which gas molecules having a size of a detection target can pass by using the above-described vibration principle.

According to another aspect of the present disclosure, a gas measurement system includes a gas measurement device and a control unit. The gas measurement device includes a filter unit and a gas sensor. The filter unit includes a plurality of terminals configured to be applied a voltage or a current and a filter configured to vibrate in response to the voltage or the current being applied to the plurality of terminals. The gas sensor detects gas molecules that have passed through the filter and outputs a measurement value corresponding to the detected gas molecules. The control unit applies the voltage or the current to the plurality of terminals such that the filter vibrates at a predetermined frequency.

In this gas measurement system, the filter of the filter unit vibrates at a predetermined frequency in response to application of the voltage or the current to the plurality of terminals of the filter unit. The filter allows gas molecules having a size corresponding to mesh of the filter to pass through. The gas molecules passing through the filter are detected by a gas sensor, and a measurement value is output. Gas molecules larger than the mesh of the filter cannot pass through the filter and tend to stay so as to block the mesh of the filter. The filter repels gas molecules that are about to stay by vibration, and prevents the mesh of the filter from being blocked. Therefore, the gas measurement device can suppress deterioration of the gas molecule sieving function. Further, even if clogging of the filter occurs due to gas molecules larger than the mesh of the filter, the large gas molecules clogged in the mesh of the filter can be removed only by sucking while vibrating the filter. Therefore, the gas measurement system can easily recover the sieving function.

A gas measurement method according to still another aspect of the present disclosure includes the following steps.
  (1) vibrating the filter;
  (2) detecting gas molecules that have passed through the vibrated filter, and outputting a measurement value corresponding to the detected gas molecules.

According to this gas measurement method, the same effect as that of the above-described gas detector can be obtained.

According to the present disclosure, it is possible to suppress a decrease in the gas molecule sieving function.

DESCRIPTION OF EMBODIMENTS

Figure 1:
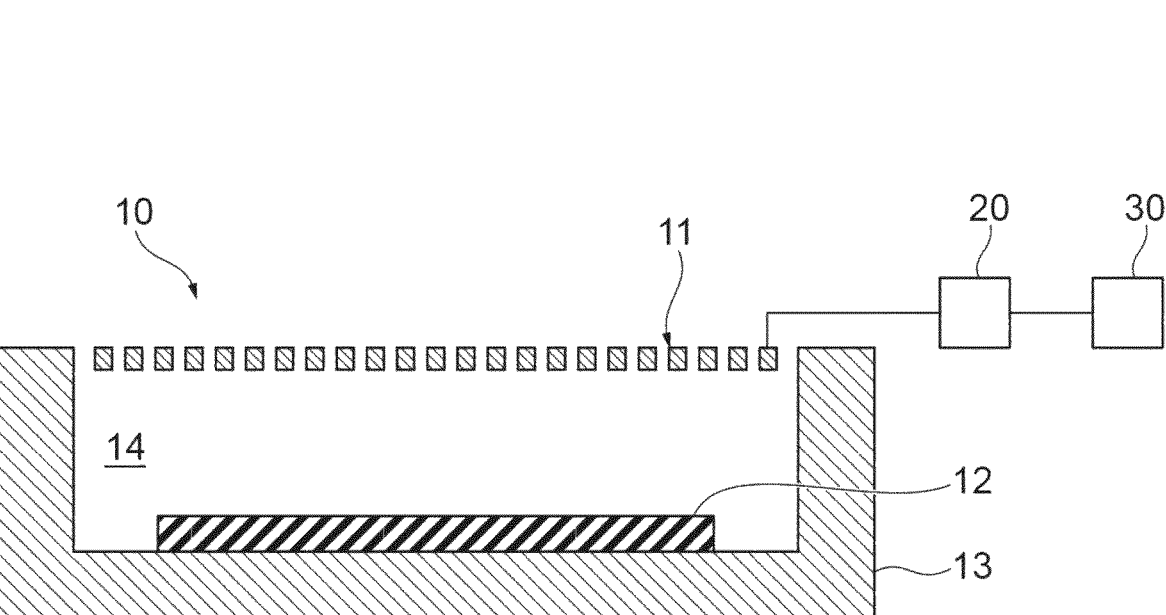
FIG. 1 is a cross-sectional view illustrating an example of a gas measurement system according to an embodiment.

Hereinafter, embodiments of the present disclosure will be described with reference to the drawings. In the following description, the same or corresponding elements are denoted by the same reference numerals, and redundant description will not be repeated. The dimensional ratios in the drawings are not necessarily consistent with those in the description. The terms "up", "down", "left" and "right" are based on the illustrated state and are for convenience.

[Configuration of Gas Measurement Device]

FIG. 1 is a cross-sectional view illustrating an example of a gas measurement system according to an embodiment. A gas measurement system 1 shown in FIG. 1 includes a gas measurement device 10. The gas measurement device 10 measures the composition of the gas. The gas measurement device 10 may be provided as an electrical circuit component. As an example, the gas measurement device 10 is MEMS (Micro Electro Mechanical Systems) devices. The gas measurement device 10 comprises a filter unit 11 and a gas sensor 12.

The filter unit 11 has the function of sieving gas molecules. The filter unit 11 is supported on a substrate 13. The substrate 13 defines a space therein. The substrate 13 is formed of a material impermeable to gas. The substrate 13 is open at an upper portion thereof and has an opening communicating with the space. The filter unit 11 is positioned to block the opening in the upper portion of the substrate 13. The filter unit 11 and the substrate 13 thereby define a gas chamber 14.

The gas sensor 12 is placed in the gas chamber 14. The gas sensor 12 detects the gas molecules that permeate the filter unit 11 and are supplied to the gas chamber 14. The gas sensor 12 outputs a measurement value in response to the detected gas molecules. As a method of detecting gas molecules in the gas sensor 12, a semiconductor method is used as an example. The detection mode of the gas sensor 12 gas molecules may be an electrochemical mode, a quartz crystal mode or a surface-acoustic-wave mode. For example, in the case of a semiconductor sensor, the measurement value output by the gas sensor 12 is a change in voltage due to a change in resistance value. The gas measurement device 10 can measure gas components contained in the detected gas based on the measurement value.

The filtering function of the filter unit 11 gas molecules is maintained in performance by the vibration of the filter. A power supply is connected to the filter unit 11, and a voltage or current is applied according to a command of a control unit 30. In response to the application of voltage or current, the filter unit 11 filter vibrates at predetermined frequencies. The term "vibrate" refers to periodic operation. The detailed configuration of the filter unit 11 will be described later.

The control unit 30 is configured as, for example, a programmable logic controller (PLC). The control unit 30 may be configured as a computer system including a processor such as a central processing unit (CPU), memories such as a random-access memory (RAM) and a read only memory (ROM), input/output devices such as a touch panel, a mouse, a keyboard, and a display, and a communication device such as a network card. The control unit 30 realizes the function of the control unit 30 by operating each hardware under the control of the processor based on the computer program stored in the memory.

The control unit 30 has a memory that pre-stores the relationship between the size or type of gas molecules and the frequencies of the filters. The control unit 30 consults the memory to determine the frequencies corresponding to the gas molecules to be detected. The control unit 30 controls the power supply 20 to apply a voltage or current to the filter unit 11 such that the filter vibrates at the determined frequencies. The control unit 30 may have a memory that pre-stores the association between the size or type of gas molecules and voltage or current. In this case, the control unit 30 determines the voltage or current with reference to the memory and controls the power supply 20 such that the determined voltage or current is applied to the filter unit 11. The control unit 30 may control not only frequencies but also amplitudes.

[Details of Configuration of Filter]

Figure 2:
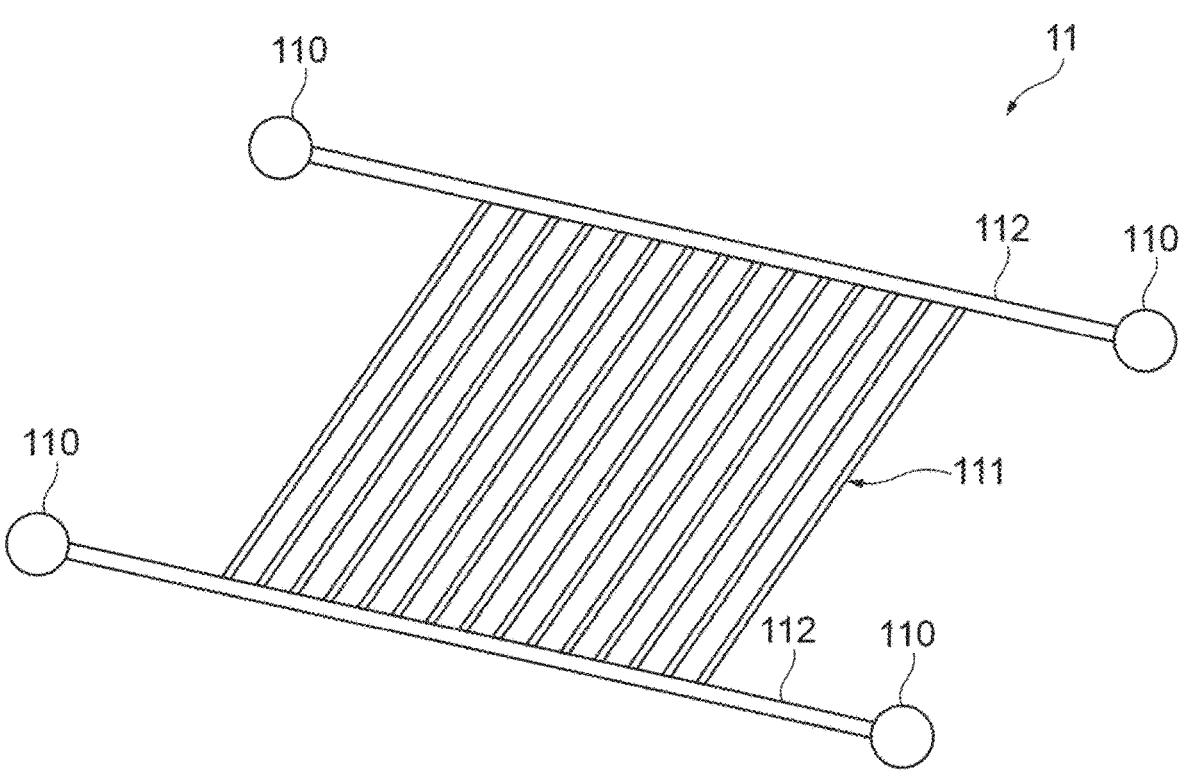
FIG. 2 is a perspective view showing an example of the filter unit.

FIG. 2 is a perspective view showing an example of the filter unit. The filter unit 11 shown in FIG. 2 is employed when the power supply 20 is the voltage source and the control unit 30 controls the power supply 20 to supply voltage to the filter unit 11. As shown in FIG. 2, the filter unit 11 includes a plurality of terminals 110, a filter 111, and a piezoelectric element 112. The plurality of the terminals 110 is formed of conductive metals. The plurality of the terminals 110 is, for example, four. The power supply 20 is connected to the plurality of the terminals 110, and a pulse voltage is applied thereto.

Here, two piezoelectric elements 112 are prepared. The piezoelectric elements 112 are arranged parallel to each other. The plurality of the terminals 110 is provided at both ends of each of the piezoelectric elements 112 and is electrically connected. When a pulse voltage is applied, each of the piezoelectric elements 112 expands and contracts according to the magnitude of the voltage.

The filter 111 is provided so as to be bridged between two piezoelectric elements 112. The filter 111 is comb-shaped. When two piezoelectric elements 112 are driven, the filter 111 vibrates at predetermined frequencies in the up-down direction (or left-right direction). The filter 111 may be made of metals such as aluminum (Al) or gold (Au), or non-metals such as resins or hard fibers.

Other Examples of Configuration of Filter

Figure 3:
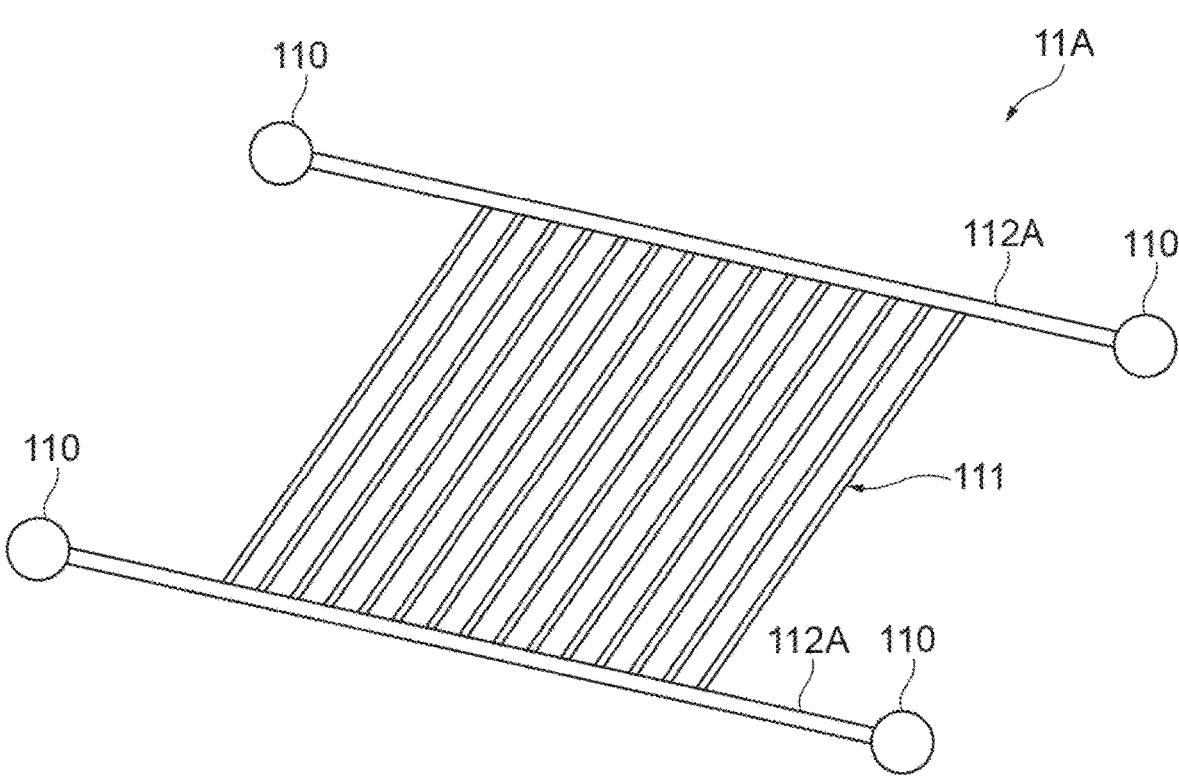
FIG. 3 is a perspective view showing another example of the filter unit.

FIG. 3 is a perspective view showing another example of the filter unit. A filter unit 11A shown in FIG. 3 is employed when the power supply 20 is the current source and the control unit 30 controls the power supply 20 to supply current to the filter unit 11. As shown in FIG. 3, the filter unit 11 includes a plurality of the terminals 110, the filter 111, and a metal member 112A. The plurality of the terminals 110 is formed of conductive metals. The plurality of the terminals 110 is, for example, four. The power supply is connected to the plurality of the terminals 110, and current is applied thereto.

Here, two metal members 112A are prepared. The metal members 112A are arranged parallel to each other. The plurality of the terminals 110 is provided at both ends of each of the metal members 112A and is electrically connected. Each of the metal members 112A vibrates when a current is applied. When current is applied to the metal members 112A, free electrons move inside the metal members 112A and collide with the atom, causing lattice vibration.

The filter 111 is provided so as to be bridged between two metal members 112A. The shape and material of the filter 111 are identical to those of the filter 111 shown in FIG. 2. Vibration of two metal members 112A propagates to the filter 111. The filter 111 vibrates at predetermined frequencies in an up-down direction (or left-right direction).

[Principle of Filter]

Figure 4A:
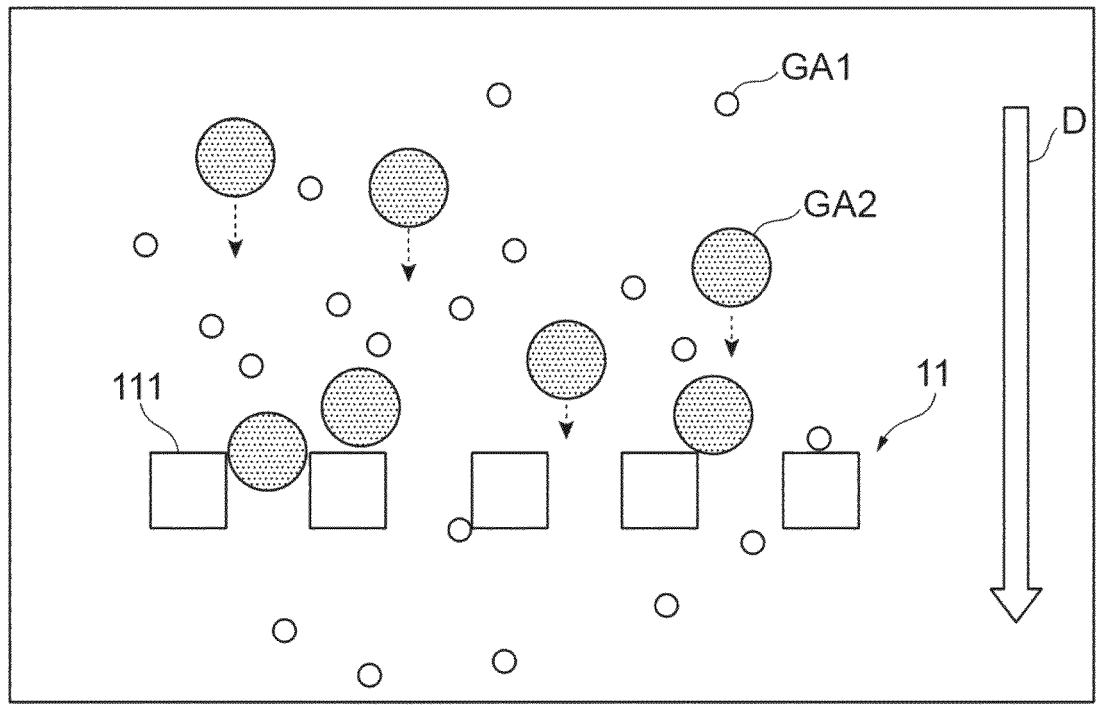
FIG. 4A is a diagram illustrating an example of the principle of a filter.
Figure 4B:
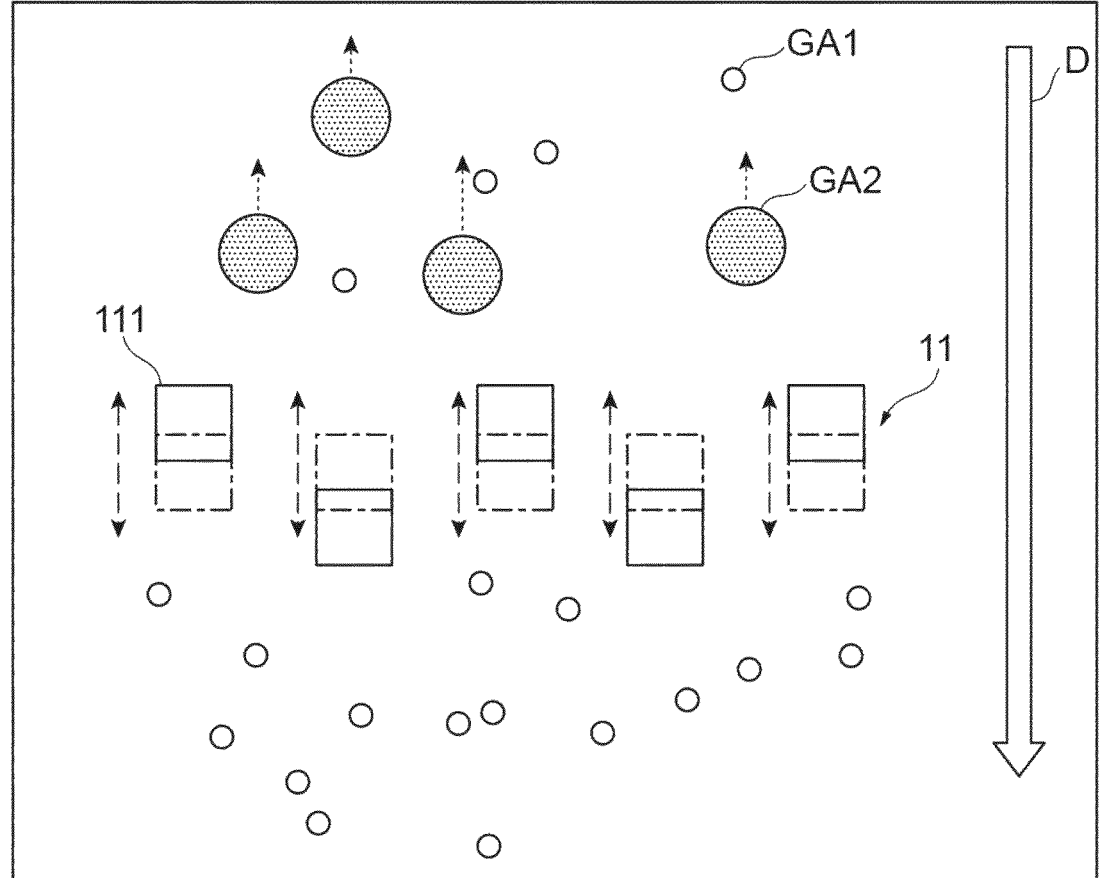
FIG. 4B is a diagram illustrating an example of the principle of a filter.

FIGS. 4A and 4B are a diagram illustrating an example of the principle of a filter. In the following description, a first gas GA1 is assumed to be detection target gas. It is assumed that the first gas GA1 is mixed with a second gas GA2 having a larger molecular size. FIG. 4A schematically shows a filter cross section in a state where no current or voltage is applied. As shown in FIG. 4A, it is assumed that the gas mixture moves in the direction indicated by an arrow D in the figure and reaches the filter unit 11. The filter 111 is at rest because no current or voltage is applied. The first gas GA1 smaller than the mesh of the filter 111 passes through the filter 111, while the second gas GA2 larger than the mesh of the filter 111 does not pass through the filter 111 and remain.

FIG. 4B schematically shows a cross section of the filter in a state where a current or a voltage is applied. Since current or voltage is applied to the filter 111, the gap is in a vibration state. For example, each the filter 111 vibrates in an up-down direction as indicated by the dashed arrow in the figure. Thus, the retained the second gas GA2 is flicked off. In this way, the occurrence of clogging of the filter 111 is suppressed.

[Operation of Gas Measurement Device]

Figure 5:
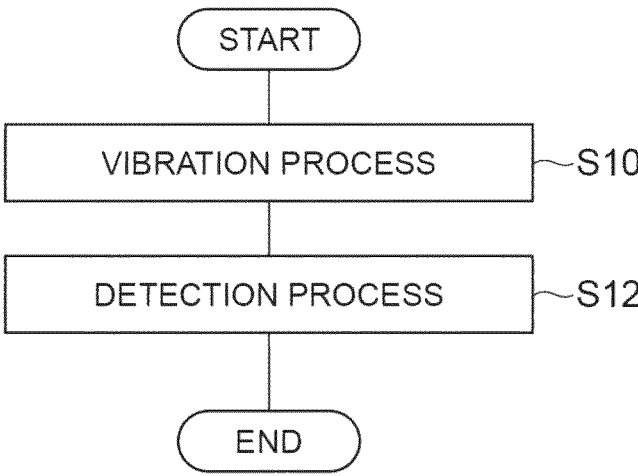
FIG. 5 is a flowchart illustrating an example of a gas measurement method according to an embodiment.

FIG. 5 is a flowchart illustrating an example of a gas measurement method according to an embodiment. Prior to performing the gas measurement method shown in FIG. 5, the gas chamber 14 is pumped to a vacuum. Alternatively, the atmosphere of the gas chamber 14 is replaced with a gas such as nitrogen or a rare gas.

As shown in FIG. 5, first, as a vibration process (step S10), the control unit 30 vibrates the filter 111 at predetermined frequencies. For example, the control unit 30 controls the power supply 20 and causes a current or voltage to be applied to the filter unit 11.

Subsequently, as a detection process (step S12), the gas mixture is supplied to the gas measurement device 10. The gas sensor 12 detects gas molecules that have passed through the vibrated the filter 111 and outputs a measurement value corresponding to the detected gas molecules. When the step S12 ends, the gas measurement method shown in FIG. 5 ends.

Summary of Embodiment

In the gas measurement system 1 and the gas measurement device 10, the filter 111 of the filter unit 11 vibrates in response to the application of voltage or current to multiple the terminal 110 of the filter unit 11. The filter 111 passes gas molecules of a size corresponding to the mesh of the filter 111. The gas sensor 12 molecules that have passed through the filter 111 are detected in the gas, and a measurement value is output. Gas molecules that are larger than the mesh of the filter 111 cannot pass through the filter 111 and tend to lodge to block the mesh of the filter 111. The filter 111 repels the stagnating gas molecules by vibration to avoid blocking the mesh of the filter 111. Therefore, the gas measurement system 1 and the gas measurement device 10 can suppress a decrease in the gas molecule sieving function.

The gas measurement system 1 and the gas measurement device 10 can remove large gas molecules by only sucking while vibrating the filter 111 even if clogging of the filter 111 occurs due to the gas molecules larger than the mesh of the filter 111. Thus, the gas measurement system 1 and the gas measurement device 10 can easily recover the sieving function.

According to the gas measurement system 1 and the gas measurement device 10, the filter 111 can be used in any usage environment without being limited by the detection method, shape, environment, and the like of the gas sensor 12. Since the filter 111 is not energized, breakage of the filter 111 due to electromigration or the like can be avoided. In addition, since the vibration is extremely fine, there is little possibility of breakage of the filter 111 due to the vibration.

The voltage or current applied to the filter unit 11 is also weak, and a change in energy such as electricity, magnetism, or heat near the filter 111 is extremely small. Therefore, even when the filter 111 is placed in the vicinity of the gas sensor 12, there is no significant influence on the detection accuracy and the life of the gas sensor 12.

[Modification]

While various exemplary embodiments have been described above, various omissions, substitutions and changes may be made without being limited to the exemplary embodiments described above.

The gas measurement device 10 may be configured to be free of the substrate 13 and the gas chamber 14. In this case, the gas measurement device 10 may be configured such that the filter unit 11 adheres to the gas sensor 12. The gas measurement system 1 may be free of the power supply 20.

The filter 111 may be provided with additional functions as necessary. For example, the filter 111 may be coated to prevent adhesion of gas molecules. Alternatively, the filter 111 may be coated such that certain gas molecules preferentially adhere thereto.

The filter unit 11 may be installed in multiple stages. In this case, the plurality of filter units is arranged to overlap each other. When the mixed gas is filtered, all filter units are vibrated. For example, the gas measurement device may comprise two stage filter units. The filter unit of the first stage (upper stage) may have a coarse mesh, and the filter unit of the second stage (lower stage) may have a mesh size that allows passage of the gas molecules to be detected. In this case, clogging is prevented by vibration while large gas molecules are removed by the first stage filter, and clogging of the second stage filter is more effectively prevented by preventing clogging of the second stage filter by vibration even by the second stage filter, so that desired gas can be detected. By installing the filter units in multiple stages, the gas measurement system 1 can transmit only gas components of extremely small molecules. Thus, the gas measurement system 1 can sieve only the desired gas with high accuracy.

The gas measurement device 10 may have a structure in which the filter vibrates under the influence of vibration of a portion adjacent to the filter 111, or may have a structure in which the filter 111 itself vibrates. The shape of the filter 111 may be grid-like instead of comb-like. The vibration direction of the filter 111 is not limited to the up-down direction, and may be the left-right direction. The cross-section of the filter 111 may be circular, square, or any other geometric shape. The filter 111 may be attached to a printed circuit board.

What is claimed is:

1. A gas measurement device, comprising:
a filter unit including a plurality of terminals configured to be applied a voltage or a current, a pair of supporting members electrically connected to the plurality of terminals, and a filter bridged between the pair of supporting members and having a mesh structure configured to sieve gas molecules, wherein the filter is configured to vibrate in response to the voltage or the current being applied to the plurality of terminals; and
a gas sensor configured to detect the gas molecules passing through the filter and output a measurement value corresponding to the detected gas molecules.

2. The gas measurement device according to claim 1, further comprising a plurality of filter units including the filter unit, wherein the plurality of filter units is disposed to overlap each other.

3. The gas measurement device according to claim 2, wherein the plurality of filter units includes the filter unit as a first filter unit and a second filter unit, the first filter unit includes the filter as a first filter, the first filter unit and the second filter unit are arranged to overlap each other, and
the first filter and a second filter of the second filter unit are each configured to vibrate, and the gas sensor is configured to detect the gas molecules passing through the first filter and the second filter.

4. The gas measurement device according to claim 1, wherein a pulse voltage is applied to the plurality of terminals, and the pair of supporting members comprises piezoelectric elements.

5. The gas measurement device according to claim 1, wherein the current is applied to the plurality of terminals, and the pair of supporting members comprises metal members.

6. The gas measurement device according to claim 1, wherein the filter is configured to vibrate at a frequency corresponding to the gas molecules to be detected.

7. A gas measurement system, comprising:
a gas measurement device comprising:
a filter unit including a plurality of terminals configured to be applied a voltage or a current, and pair of supporting members electrically connected to the plurality of terminals, and a filter bridged between the pair of supporting members and having a mesh structure configured to sieve gas molecules, wherein the filter is configured to vibrate in response to the voltage or the current being applied to the plurality of terminals; and
a gas sensor configured to detect the gas molecules passing through the filter and output a measurement value corresponding to the detected gas molecules; and
a controller configured to apply the voltage or the current to the plurality of terminals such that the filter vibrates at a predetermined frequency.

8. A gas measurement method, comprising:
vibrating a filter bridged between a pair of supporting members and having a mesh structure configured to sieve gas molecules by applying the voltage or the current to a plurality of terminals electrically connected to the pair of supporting members; and
detecting the gas molecules that have passed through the vibrated filter and outputting a measurement value corresponding to the detected gas molecules.

* * * * *